US012179209B2

(12) United States Patent
Krauss et al.

(10) Patent No.: US 12,179,209 B2
(45) Date of Patent: Dec. 31, 2024

(54) CRUSHING PLANT

(71) Applicant: Kleemann GmbH, Göppingen (DE)

(72) Inventors: Till Krauss, Rechberghausen (DE); Jochen Meier, Hülben (DE)

(73) Assignee: Kleemann GmbH, Göppingen (DE)

( * ) Notice: Subject to any disclaimer, the term of this patent is extended or adjusted under 35 U.S.C. 154(b) by 0 days.

(21) Appl. No.: 17/731,300

(22) Filed: Apr. 28, 2022

(65) Prior Publication Data

US 2022/0355307 A1 Nov. 10, 2022

(30) Foreign Application Priority Data

May 7, 2021 (DE) ..................... 10 2021 111 930.8

(51) Int. Cl.
*B02C 1/02* (2006.01)
*B02C 21/02* (2006.01)
*B02C 23/00* (2006.01)

(52) U.S. Cl.
CPC .................................... *B02C 1/025* (2013.01)

(58) Field of Classification Search
CPC ......... B02C 1/02; B02C 1/025; B02C 21/026; B02C 23/00; B02C 25/00
See application file for complete search history.

(56) References Cited

U.S. PATENT DOCUMENTS 5,797,548 A * 8/1998 Tamura .................. B02C 13/31 241/35
2011/0077821 A1 3/2011 Yamaguchi et al.
(Continued)

FOREIGN PATENT DOCUMENTS

CN 108114767 A * 6/2018
DE 1148850 B 5/1963
(Continued)

OTHER PUBLICATIONS

English translate (WO2019206654A1), retrieved date Jun. 9, 2023.*
(Continued)

*Primary Examiner* — Mohammed S. Alawadi
(74) *Attorney, Agent, or Firm* — Lucian Wayne Beavers; Patterson Intellectual Property Law, PC

(57) ABSTRACT

The invention relates to a crusher plant, in particular a jaw crusher, including a crushing unit for crushing mineral material, the crushing unit comprising a crushing chamber, to which a crusher outlet is assigned, via which crushed material exits the crushing chamber, at least one actuator being provided, by which the opening size of the crusher outlet is adjustable in the event of an overload situation in the crushing unit, in order to discharge faulty material from the crushing chamber, a belt conveyor being provided after the crusher outlet in the material conveying direction, faulty material being transportable by the belt conveyor from the crusher outlet, following an overload situation, toward a transfer end of the belt conveyor, a detection device being provided, by which the overload situation of the crushing unit or an operating change of the crushing unit brought about as a consequence of the overload situation is detected and an overload signal is then generated, and a control device controlling the belt conveyor and/or monitoring the faulty material transported on the belt conveyor by taking into account the overload signal. According to the invention, it is thus possible to restore the operational readiness of the crushing plant quickly and in a simple manner following the occurrence of an overload situation.

15 Claims, 6 Drawing Sheets

(56) References Cited

U.S. PATENT DOCUMENTS

| | | | | |
|---|---|---|---|---|
| 2011/0089270 | A1* | 4/2011 | Juha | B02C 21/00 241/34 |
| 2014/0108182 | A1* | 4/2014 | Hoban | G05B 19/41875 700/109 |
| 2015/0290654 | A1* | 10/2015 | Permi | B02C 25/00 241/24.1 |
| 2021/0107012 | A1 | 4/2021 | Hommel et al. | |
| 2021/0138477 | A1 | 5/2021 | Meier et al. | |
| 2021/0299674 | A1* | 9/2021 | Narayanaswamy | B02C 21/02 |

FOREIGN PATENT DOCUMENTS

| | | | | |
|---|---|---|---|---|
| DE | 102018110265 | A1 | 10/2019 | |
| DE | 102019126978 | A1 | 4/2021 | |
| EP | 724910 | A1 | 8/1996 | |
| GB | 973249 | A * | 10/1964 | B02C 25/00 |
| WO | WO-2019206654 | A1 * | 10/2019 | B02C 1/025 |

OTHER PUBLICATIONS

English translate (CN108114767A), retrieved date Jun. 9, 2023.*
European Patent Office Search Report for corresponding patent application 22163096.5, dated Sep. 16, 2022, 7 pages (not prior art).
German Office Action for corresponding patent application No. 10 2021 111 930.8, dated Feb. 24, 2022, 10 pages (not prior art).

* cited by examiner

CRUSHING PLANT

BACKGROUND OF THE DISCLOSURE

Field of the Disclosure

The invention relates to a crusher plant, in particular a jaw crusher, including a crushing unit for crushing mineral material, the crushing unit including a crushing chamber, to which a crusher outlet is allocated, via which crushed material exits the crushing chamber, at least one actuator being provided, by which the size of the opening of the crusher outlet is adjustable in the event of an overload situation in the crushing unit, in order to discharge faulty material from the crushing chamber, a belt conveyor being provided following the crusher outlet in the direction in which material is conveyed.

Within the scope of the invention, a crushing unit may be, in particular, a jaw crusher unit, which has two crushing jaws, one of the crushing jaws preferably being fixed and the other movable. The crushing chamber is formed at least in regions between the two crushing jaws. Preferably, the crushing jaws are arranged with respect to each other so as to produce a tapering crushing chamber. In the area of a crusher outlet, the two crushing jaws are situated opposite to each other, it being possible for the crusher outlet to be formed by a crushing gap.

DESCRIPTION OF THE PRIOR ART

A jaw crusher is known from DE 10 2018 110 265 A1 (US 2021138477). Accordingly, the jaw crusher has two crushing jaws, as was described above. Material to be crushed is continuously fed to the crushing unit via a material feed. It may happen that the material to be crushed contains faulty material. Faulty material is material that cannot be crushed by the crushing unit or cannot be crushed completely by the crushing unit. Faulty material may be for example a particularly hard and/or tough material, in particular a piece of steel, which is situated in the material to be crushed. Faulty material may also be wood, which is carried along with the material to be crushed. DE 10 2018 110 265 A1 (US 2021138477) describes an overload safety device so that the crushing unit is not damaged. As soon as an object that cannot be crushed or crushed only with difficulty is located in the crushing chamber, the overload safety device is triggered and lets the foreign body escape through the opening crushing gap together with material that is not crushed or crushed only a little (faulty material). In the related art, this material nevertheless always lands on the pile of crushed material along with the material crushed in a regular crushing gap setting. When the material feed is stopped, the crushing unit is then returned into its initial state by closure of the crushing gap.

SUMMARY OF THE DISCLOSURE

The objective of the invention is to restore, in a simple manner, the operation of a crushing plant following the triggering of an overload situation.

This objective is achieved by the features of the claims. Accordingly, it is provided that, following an overload situation, faulty material is transported by the belt conveyor to a transfer end of the belt conveyor, that a detection device is provided, which detects the overload situation of the crushing unit or an operational change of the crushing unit brought about as a result of the overload situation and then produces an overload signal, and that the belt conveyor, by taking into account the overload signal, is controlled or controllable by a control device and/or that the faulty material transported on the belt conveyor is monitored.

The belt conveyor is therefore used as a material store, into which the crushing unit is emptied following an overload situation. Accordingly, the faulty material is transported on the belt conveyor in the direction toward the transfer end. In this manner, the non-crushable material, which brought about the overload situation, may be transported via the crusher outlet out of the crushing chamber. Once this material has been removed from the crushing chamber, it is then possible to restore the proper operating state at the crushing unit and to resume to crushing process. This clearly improves and simplifies the operation of a crushing plant.

The invention furthermore provides for the generation of the overload signal and the processing of this overload signal in a control device. The control device then controls the belt conveyor, in particular the drive of the belt conveyor. Additionally or alternatively, it may also be provided that, following the processing of the overload signal, the transport of the material on the belt conveyor, in particular the transport of the faulty material, is monitored.

By this measure, it is possible to ensure that the faulty material is not unintentionally transported by the belt conveyor in the direction toward the transfer end and is then discharged there. The faulty material would then contaminate a pile, on which properly crushed material is already situated.

In particular, it is possible to stop the transport of the material, for example, by monitoring the material transport and controlling the belt conveyor, before the faulty material is discharged over the transfer end, or additional measures may be taken to remove the faulty material from the belt conveyor.

Within the scope of the invention, it may also be provided that, following the triggering of the overload situation, the machine operator transfers either the entire crushing plant and/or the belt conveyor into an altered operating position, in order then to deposit the faulty material separately.

It is also conceivable that for example an additional conveyor belt or a wheel loader is positioned below the discharge area of the belt conveyor, in order to deposit the faulty material separately.

According to a preferred variant of the invention, it may be provided that the position of faulty material on the belt conveyor is detected or monitored using a faulty material ascertaining device. Accordingly, it is possible to detect and/or monitor the position of the faulty material, which is moved out of the crushing chamber following the triggering of an overload situation. When the overload situation is triggered, properly crushed material is still located on the belt conveyor, which left the crushing chamber before the overload situation was triggered. This properly crushed material may continue to be unloaded onto the pile via the belt conveyor. Due to the fact that now the position of the faulty material, which follows the properly crushed material on the belt conveyor, is monitored, it is ensured that at least a great portion of the properly crushed material located on the belt conveyor is also properly unloaded.

According to a preferred variant of the invention, it may be provided that the faulty material ascertaining device detects the faulty material on the belt conveyor directly, in particular optically or acoustically, or that the faulty material ascertaining device detects the faulty material on the belt conveyor indirectly.

In the direct detection of the faulty material, the latter may be detected directly on the belt conveyor. For this purpose, a camera or an ultrasonic device having a sounder and a sonic sensor may be provided, for example. For example, using a suitable recognition software, for example image recognition software, the faulty material may then be detected on the belt conveyor. The recognition software sends a corresponding monitoring signal to the control device, in order to monitor the position of the faulty material on the belt conveyor continuously or discontinuously.

It is also conceivable that the position of the faulty material on the belt conveyor is detected indirectly. Following the triggering of the overload situation, for example after generating the overload signal, it is possible for example to detect and evaluate the belt speed or the drive speed of the drive of the belt conveyor. From this information, it is then possible to infer the distance that the faulty material on the belt conveyor has traveled following the triggering of the overload signal. For example, before the faulty material has reached the transfer end of the belt conveyor, the belt conveyor may be stopped. Additionally or alternatively, it may also be provided that when the faulty material has reached a predetermined position, in particular a conveyor height, on the belt conveyor, this faulty material is removed from the belt conveyor.

According to the invention, it may also be provided that after the detection device has detected the overload situation of the crushing plant or the detection device has detected an operational change of the crushing plant brought about as a result of the overload situation, in particular after receiving of the overload signal, a counting device is started or monitored, in order to monitor the position of the faulty material on the belt conveyor indirectly. As mentioned above, the counting device may be a position measuring system, which detects the position of the faulty material on the belt conveyor indirectly or directly. For this purpose, there may be a provision that the counting device is a speedometer, a stepper motor, a revolution counter, a clock or the like, as mentioned previously. The counting device may also be referred to as a counter.

A possible variant of the invention may be characterized by the fact that the belt conveyor is drivable using a belt drive, and that the control device causes a change, preferably a reduction, in the conveying speed of the belt drive following the reception of the overload signal, or that following the reception of the overload signal the control device is switched to a manual operating state.

As mentioned above, within the scope of the invention, the belt conveyor may be used as a material reservoir, on which the faulty material is temporarily stored following the triggering of the overload situation. Via the control of the conveying speed, it is now possible to control the conveying speed of the belt drive preferably in such a way that, if possible, the entire material is discharged from the crushing chamber onto the conveyor belt, until the proper operating state of the crushing plant is restored.

According to a particularly preferred variant of the invention, the control device is switched to a manual operating state following the reception of the overload signal. For this purpose, the manual operating state may initially comprise in particular that the conveying speed of the belt conveyor is reduced following the reception of the overload signal and/or that the belt conveyor is stopped. Subsequently, an operator may take over control of the belt conveyor as desired in order to remove the faulty material located on the belt conveyor in a suitable manner from the belt conveyor.

Preferably, for controlling the belt drive, it is provided that the conveying speed of the belt drive is variable by way of a frequency converter for electrically controlling the belt drive or by way of a gear unit associated with the belt drive.

A further development of the aforementioned idea may provide for the belt conveyor, following the reception of the overload signal, to be operated preferably at a uniform speed or further preferably at an altered speed, in particular a reduced speed, and for the control device to stop the belt conveyor at a subsequent time. If a reduced speed is implemented, then it is possible to increase the material accumulation on the belt conveyor, so that preferably the entire crushed material from the crushing chamber fits on it. When the faulty material has reached a specific belt position, for example before it has reached the transfer end, the belt conveyor is stopped.

After the belt conveyor has been stopped, the positioning of the belt conveyor may be changed for example, for example in that the belt conveyor is turned with respect to a frame of the machine. To change the position of the belt conveyor, it is alternatively or additionally possible to move in particular the entire crushing plant and specifically into a position in which the belt conveyor is then subsequently able to unload the faulty material or in which the faulty material is removed from the belt conveyor.

When, according to one variant of the invention, as described above, the manual operating state is activated, it may be provided that a signal link is established between the control device and a manual operating unit indirectly or directly, and that in the manual operating state an operator controls the belt conveyor, in particular the belt drive, by way of operating elements. The operator then has control over the belt conveyor and is able to transfer it as desired into a conveying state or to stop it.

In this connection, it may be accordingly provided that the operating elements of the manual operating unit and the control device are designed to vary the conveying speed of the belt conveyor and/or to stop the belt conveyor.

According to a particularly preferred variant of the invention, it may be provided that the manual operating unit is connected to the control device via a wireless signal link, the signal link preferably being developed in a bidirectional manner. It is also conceivable for a wire-bound link to be provided, the manual operating unit in this case being situated for example on the crushing plant.

A crushing plant according to the invention may be designed in such a way that an operator is able to activate a restart mode, that upon activation of the restart mode first the belt conveyor is started up (preferably started up slowly), that subsequently the crushing unit and then a material feeder device, which feeds the material to be crushed to the crushing unit, are adjusted.

Preferably, when restarting, the belt is started up, preferably slowly, and at the same time the charging of the material is started. Preferably, at this time, the crushing gap is already back in the target state. As a result, "support material" is immediately formed on the conveyor belt, which allows for the transport of the faulty material without it rolling back (counter to the conveying direction), if the latter was not yet unloaded. This enables the machine operator to position a wheel loader bucket at the discharge end of the belt conveyor after stopping the plant. Then he is able to start the restart mode. Once the faulty material has been unloaded into the wheel loader bucket, the operator drives the wheel loader away and the plant already runs again in the normal operating mode.

A possible variant of the invention is designed in such a way that a removal device is assigned to the belt conveyor in the area between the crusher outlet and the transfer end, which is designed to remove faulty material from the belt conveyor. Such a removal device makes it possible to clear the conveyor belt of the faulty material. In particular, it may be provided that the removal device is activated by the control device as soon as the faulty material on the belt conveyor has reached a specific position. This makes it possible to continue to unload the material, which is still located on the belt conveyor and which was still properly crushed, onto the pile. As soon as the faulty material has reached the removal device or arrives in its proximity, the removal device is activated and the faulty material is removed from the conveyor belt. For this purpose, it may be provided in particular that the conveyor belt continues to operate at the same or at an altered speed and that at the same time the conveyor belt removes the faulty material continuously or discontinuously from the conveyor belt.

Preferably, it may be provided in this instance that the removal device removes the material transported on the belt conveyor, in particular the faulty material, from the conveyor belt in the transverse direction relative to the conveying direction of the belt conveyor.

A simple and effectively operating removal device may be designed in that the removal device has a support structure, on which a revolving conveyor belt is held, that the conveyor belt has deflectors, and that the deflectors remove the material transported on the belt conveyor, in particular the faulty material, from the belt conveyor.

According to an inventive alternative, it may also be provided that an adjusting device is provided, by which the removal device is adjustable between a return position, in which the removal device is lifted off the belt conveyor, and a removal position, in which the removal device is able to remove the material transported on the belt conveyor, in particular the faulty material, from the belt conveyor. In the proper operation of the crushing plant, the removal device is held in the return position, so that the belt conveyor is able to transport the properly crushed material away. Following the triggering of an overload situation, the removal device may be brought into the return position by way of the adjusting device.

Particularly preferably, a crushing plant according to the invention may be designed in such a way that a material feeder device is provided, which is situated and designed to feed material to be crushed to the crushing unit and which is in particular situated in front of the crushing unit in the direction of the material flow, and that the control device, after the detection device has detected an operational change of the crushing unit brought about as a result of the overload situation, controls the material feeder device in such a way that the latter no longer feeds material to be crushed to the crushing unit or feeds a reduced quantity of material to the crushing unit. In this manner, it is possible to keep the quantity of the faulty material discharged from the crushing unit low, following the triggering of an overload situation.

BRIEF DESCRIPTION OF THE DRAWINGS

The invention will be explained below in greater detail with reference to an exemplary embodiment shown in the drawings.

DETAILED DESCRIPTION

Figure 1:
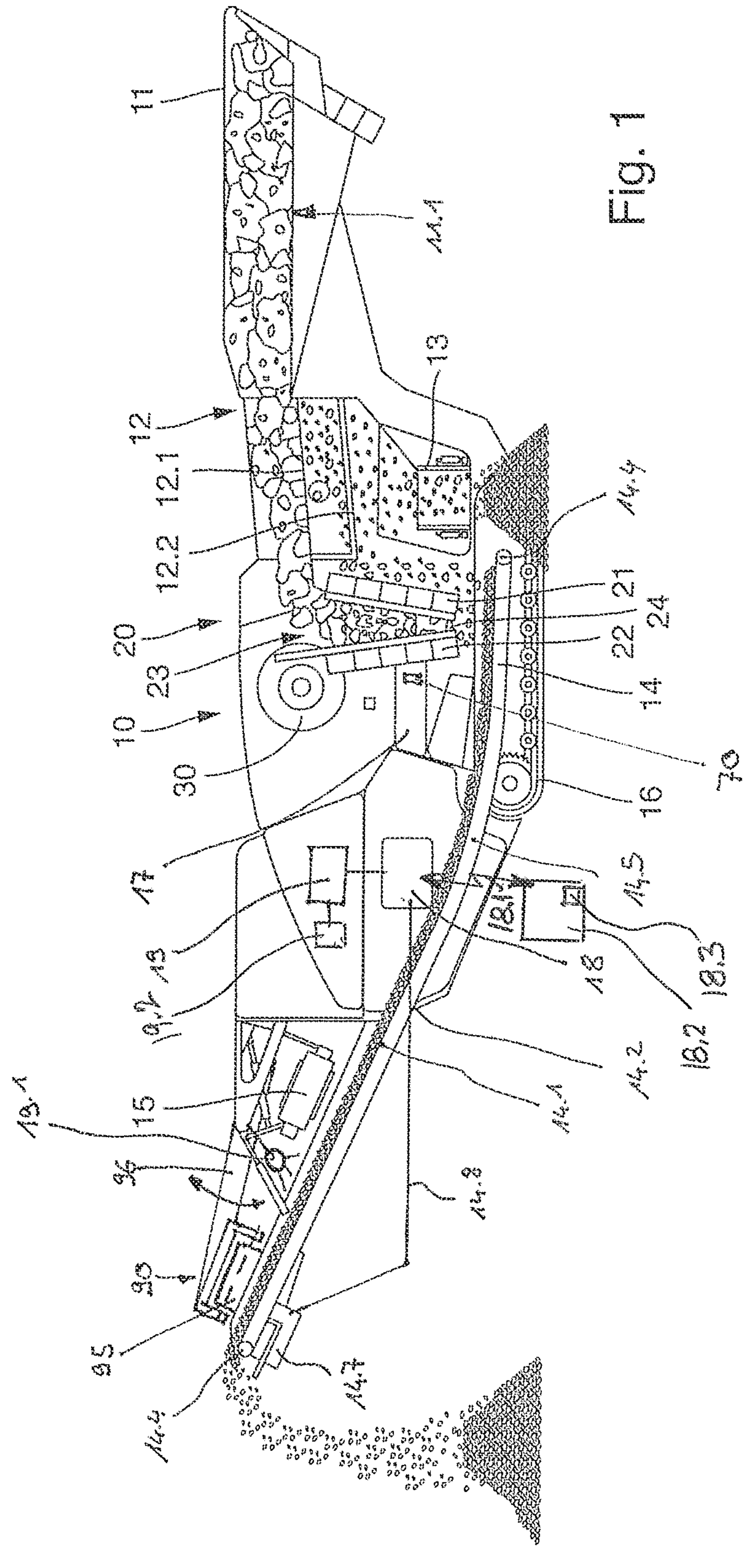
FIG. 1 shows a crushing plant in a schematic lateral view.

FIG. 1 shows a crushing plant 10, namely a jaw crusher plant. This crushing plant 10 includes a charging unit, which preferably has a charging hopper 11. Using e.g. a power shovel, crushing plant 10 may be loaded in the area of the charging hopper 11 with rock material that is to be crushed.

Connected downstream to the charging hopper 11, a material feeder device 11.1 is provided, which may include in particular a screen unit 12. Via the material feeder device 11.1, material to be crushed may be fed to a crushing unit 20.

Screen unit 12 includes at least one screen deck 12.1, 12.2. Two screen decks 12.1, 12.2 are used in the present exemplary embodiment. Using the first screen deck 12.1, a grain fraction may be screened out of the material to be crushed, which already has a suitable size. This partial flow does not have to be channeled through the crushing unit 20. Rather it is channeled in the bypass past the crushing unit 20 so as not to put a load on the crushing unit 20. At the second screen deck 12.2, a finer grain fraction is screened out of the previously screened partial fraction. This so-called fine grain may then be discharged via a lateral belt 13, which is formed for example by a continuously revolving conveyor means.

It is also conceivable that the screen unit 12 has only one screen deck 12.1, namely, the upper screen deck 12.1.

The material flow, which is not screened out at the first screen deck 12.1, is fed to the crushing unit 20. Crushing unit 2 includes a fixed crushing jaw 21 and a movable crushing jaw 22. A crushing chamber 23 is formed between the two crushing jaws 21, 22. At their lower end, the two crushing jaws 21, 22 bound a crusher outlet 24. The two crushing jaws 21, 22 thus form a crushing chamber 23 converging toward the crusher outlet 24. The crusher outlet 24 is therefore in the present case formed by the crushing gap of the jaw crusher.

Figure 2:
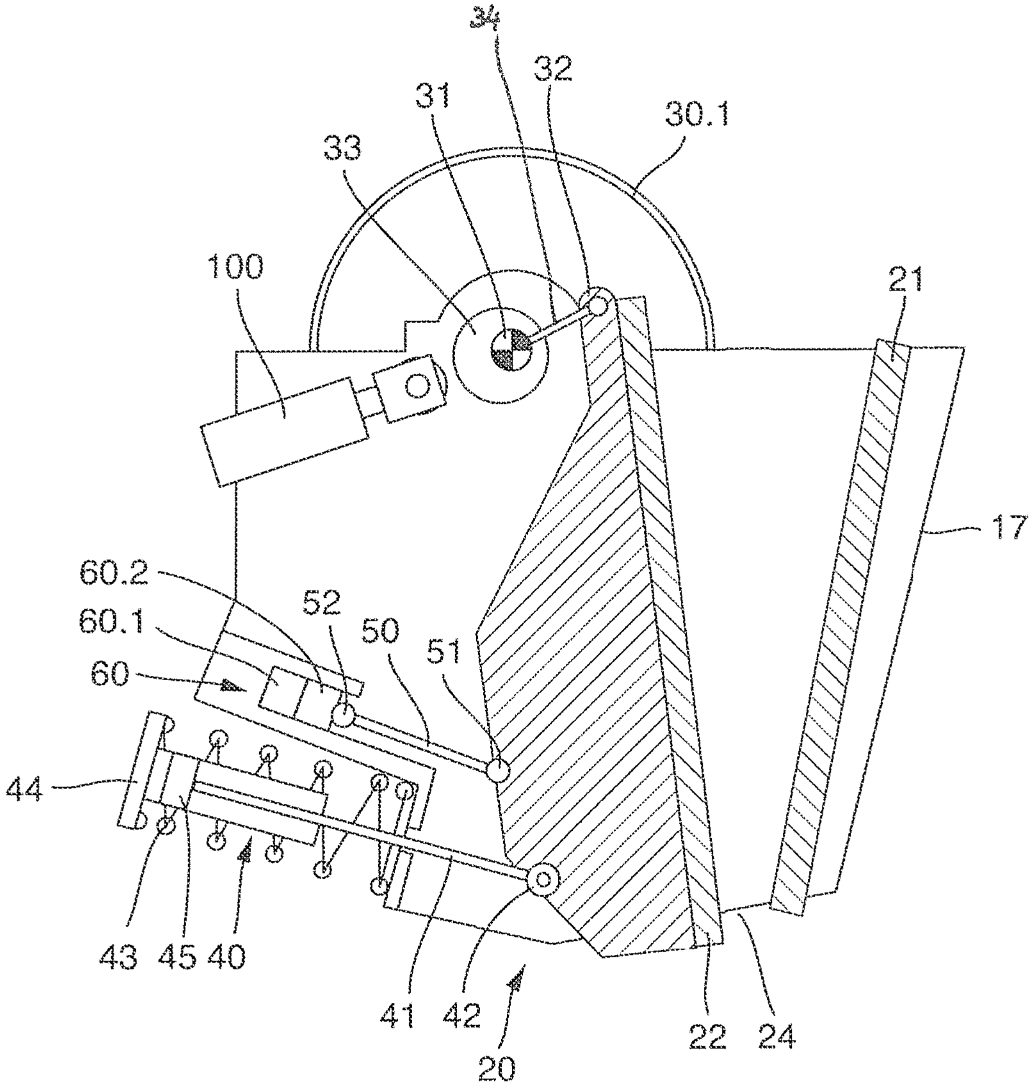
FIG. 2 shows a crushing unit of the crushing plant as shown in FIG. 1 in a lateral view and schematic illustration.

As shown in FIG. 2, the fixed crushing jaw 21 is fixedly mounted in the crusher frame 17. The movable crushing jaw 22 is driven in a known manner by a crusher drive 30. The crusher drive 30 has a drive shaft 31, on which a flywheel 30.1 is mounted in a torsionally fixed manner.

As shown further in FIG. 1, the crushing plant has a belt conveyor 14 below the crusher outlet 24 of crushing unit 20. Both the screened material channeled in the bypass past the crushing unit 20, which is screened out at the first screen deck 12.1, as well as the rock material crushed in the crushing chamber falls onto the belt conveyor 14. The belt conveyor 14 conveys this rock material out of the working area of the machine in order to transport it onto a stockpile.

As shown in FIG. 1, a magnet 15 may be used, which is situated in an area above the belt conveyor 14. The magnet 15 may be used to lift pieces of iron out of the transported crushed material. This prevents pieces of iron located in the crushed material from being unloaded at the transfer end of the belt conveyor 14 on the crushed material pile.

As the drawings show, belt conveyor 14 may be a perpetually revolving conveyor belt, which has a load side and a return side 14.1 and 14.2. The load side 14.1 is used to catch the crushed material, which falls out of the crusher outlet 24 of crushing unit 20, and to remove it. At the ends of the belt, the conveyor belt may be deflected by deflection rollers 14.4 between the load side 14.1 and the return side 14.2. In the area between the deflection rollers 14.4, guides, in particular support rollers 14.5 (see FIG. 8), may be provided in order to change the conveying direction of the conveyor belt, to give the conveyor belt a specific shape and/or to support the conveyor belt.

The belt conveyor 14 has a belt drive 14.7, by which the belt conveyor 14 may be driven. The belt drive 14.7 may preferably be situated at the transfer end or in the area of the transfer end of the belt conveyor 14, as shown in FIG. 1.

Via a control line 14.8, the belt conveyor 14 may be connected to a control device 18, for example by way of the belt drive 14.7. Accordingly, the belt drive 14.7 and with it the belt conveyor 14 may be controlled by the control device 18. This makes it possible for example to set or change the conveying speed of the belt drive, preferably reducing it in case of an overload. The control device 18 may also be referred to as a controller 18.

FIG. 1 shows that a detection device 19 may be assigned to the belt conveyor 14. The detection device 19 may comprise suitable programming of the controller 18 to perform the functions described herein. The detection device 19 may be included in or be a part of the controller 18. The detection device 19 is connected to a sensor system, which is designed and positioned to detect, continuously or discontinuously, material that is conveyed on the load side 14.1 of the belt conveyor 14. For this purpose, a faulty material ascertaining device 19.1 may be provided for example, which is connected to the detection device 19 or controller 18. Using the faulty material ascertaining device 19.1 it is possible to detect and/or track the position of faulty material 200 on the belt conveyor 14 indirectly or directly. The faulty material ascertaining device 19.1 may comprise for example a camera and image recognition software. The faulty material ascertaining device 19.1 may also be referred to as a faulty material position sensor 19.1 configured to detect a position of the faulty material on the belt conveyor 14 and to generate a position signal which is transmitted to the controller 18. Alternatively, the detection device 19 or controller 18 may include or be connected to a counter 19.2. The counter 19.2 may be a position measuring system, which detects the position of the faulty material on the belt conveyor 14 indirectly or directly. For this purpose, there may be a provision that the counter 19.2 is a speedometer, a stepper motor, a revolution counter, a clock or the like.

FIG. 1 further shows that a removal device 90 may be optionally situated on the machine frame 17. The removal device 90 has a support structure 91, which supports a perpetually revolving conveyor belt 95. The removal device 90 may also be referred to as a removal conveyor 90.

Figure 8:
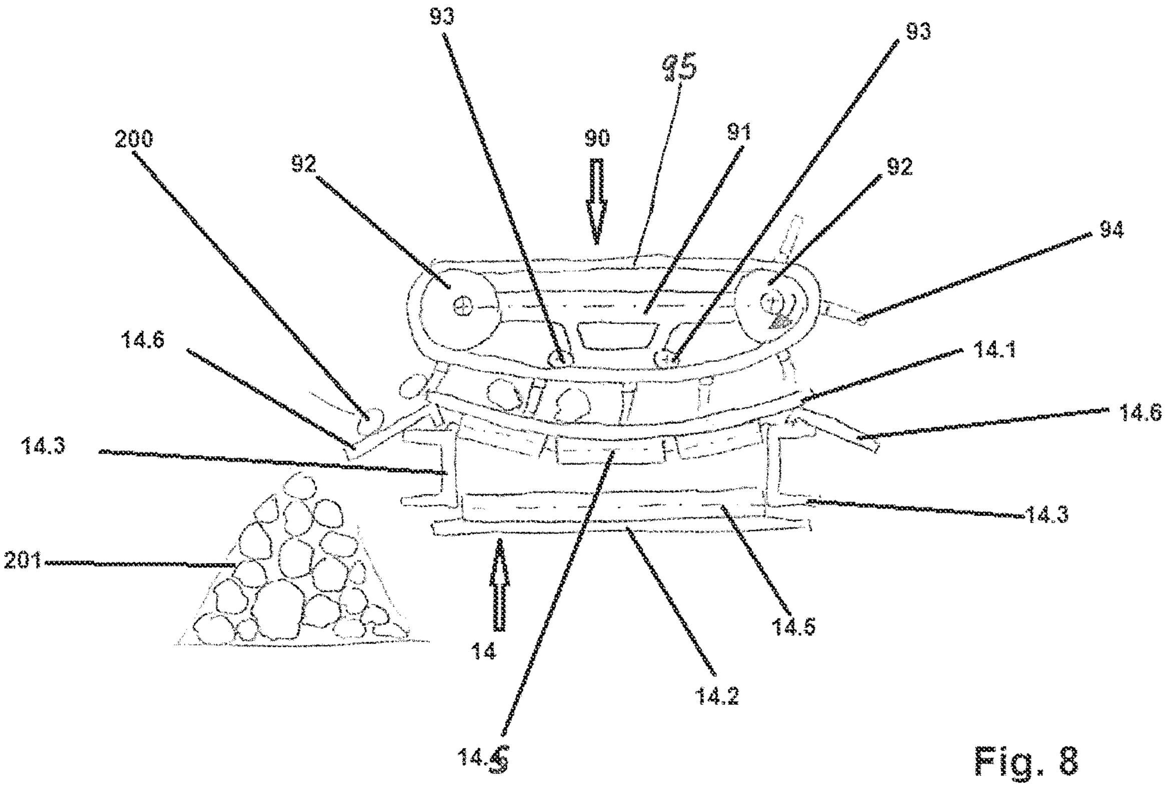

The construction of the removal device 90 is shown in more detail in FIG. 8 by way of example. As this illustration shows, the support structure 91 of removal device 90 is situated at least in some regions in the space surrounded by conveyor belt 95. The support structure 91 supports two deflection rollers 92, the deflection rollers 92 being preferably rotatable about two axes of rotation that are parallel to each other. Conveyor belt 95 runs around the deflection rollers 92. The direction of movement of the conveyor belt 95 runs crosswise with respect to the direction of movement of the belt conveyor 14, in particular perpendicularly with respect to it, as shown in FIG. 8.

On its upper side, the conveyor belt 95 may be fitted with deflectors 94. Deflectors 94 may be connected in one piece with the conveyor belt 95. Deflectors 94 are designed and situated to remove, in a removal position of removal device 90, material, particularly faulty material 200, from the load side 14.1 of belt conveyor 14.

In order to achieve a particular good removal effect, a guide 93 may exist on support structure 91, which at least in regions adapts the geometry of conveyor belt 95 facing the load side 14.1 to a concave shape of the load side 14.1, as shown in FIG. 8. Accordingly, the guide 93 brings about a convex curvature of this area of conveyor belt 95 facing the load side 14.1.

As FIG. 8 illustrates, a concave contour of the load side 14.1 may be produced by support rollers 14.5, which are situated in the area between the load side 14.1 and the return side 14.2 of belt conveyor 14. For this purpose, several of these support rollers 14.5 are situated at a distance from one another in the longitudinal direction of the belt conveyor 14 and fastened on lateral belt supports 14.3. For the orderly return of the return side 14.2, the latter may likewise have support rollers 14.5 assigned to it, which are again located in the space between the load side 14.1 and the return side 14.1 and may be rotatably fastened on the belt supports 14.3.

As FIG. 8 illustrates further, lateral guide elements 14.6 may be situated on belt conveyor 14 in the area of the removal device 90. If the removal device 90 is in the removal position shown in FIG. 8, then, via a motor-driven conveyor belt 95, faulty material 200 situated on the load side 14.1 may be laterally removed by the deflectors 94. This faulty material 200 arrives on the guide elements 14.6 and then falls laterally from belt conveyor 14 onto a faulty material pile 201.

FIG. 1 illustrates further that an adjusting device 96 is assigned to the removal device 90. Using this adjusting device 96, it is possible to adjust, in particular to swivel, the removal device 90 between the removal position shown in FIGS. 1 and 8 and a return position.

In the return position, the removal device 90 together with its conveyor belt 95 is lifted upward away from the belt conveyor 14. This clears the path on the belt conveyor 14 and allows for crushed material that was properly crushed in crushing unit 20 to be unloaded onto the crushed material pile shown on the left in FIG. 1.

FIG. 1 finally shows that the present crushing plant 10 is a mobile crushing plant. It has a machine undercarriage, which is supported by two traveling gears 16, in particular two crawler track traveling gears. The present invention is naturally not limited to the use in mobile crushing plants. The use in stationary plants is also conceivable.

FIG. 2 shows the kinematic design of the crushing unit 20 in greater detail in a lateral view. In this illustration, the fixed crushing jaw 21 and the movable crushing jaw 22 are clearly visible.

The movable crushing jaw 22 may be developed in the form of a crushing rocker, as in the present case. It has a bearing point at the top, via which it is rotationally mounted and connected to the drive shaft 31. The drive shaft 31 is on the one hand rotationally mounted on the crusher frame 17 and is on the other hand rotationally mounted via the eccentric portion of the drive shaft, for example a lever 34, in a bearing 32 of the movable crushing jaw 22. A flywheel 30.1 having a great mass is coupled to the drive shaft 31 in a rotatably fixed manner. The drive shaft 31 itself is designed eccentrically. In case of a rotary motion of drive shaft 31, the movable crushing jaw 22 thus likewise performs a gyrating circular movement following the eccentric movement.

A pressing plate 50 may be provided in the area of the free end of the movable crushing jaw 22. The pressing plate 50 is supported on the movable crushing jaw 22 via a pressing plate bearing 51. A further pressing plate bearing 52 supports the pressing plate 50 with respect to an adjusting unit 60.

The adjusting unit 60 is used to adjust the crusher outlet 24 between the two crushing jaws 21, 22.

A tensioning cylinder 40 may be provided in order to be able to maintain in a defined manner during the crushing process the allocation of the pressing plate 50 to the adjusting unit 60 on the one hand and to the movable crushing jaw 22 on the other hand. The tensioning cylinder 40 has a piston rod 41, which supports a fastening element 42 at its one end. The fastening element 42 is fastened in a swiveling manner to the movable crushing jaw 22. The piston rod 41 is connected to a piston 45. The piston 45 is linearly adjustable in the tensioning cylinder 40. The housing of the tensioning cylinder 40 is supported by a mount 44. The mount 44 is braced with respect to a component of the crusher frame 17 via at least one, preferably two pressure springs 43. Accordingly, a spring preload is introduced. The spring preload pulls the housing of the tensioning cylinder 40 and with it the piston 45 and the piston rod 41. In this manner, a tensional force is introduced into the movable crushing jaw 22, which is transmitted into the pressing plate 50. Accordingly, the pressing plate 50 is thereby clamped between the movable crushing jaw 22 and the adjusting unit 60 and retained in a preloaded manner.

Figure 3:
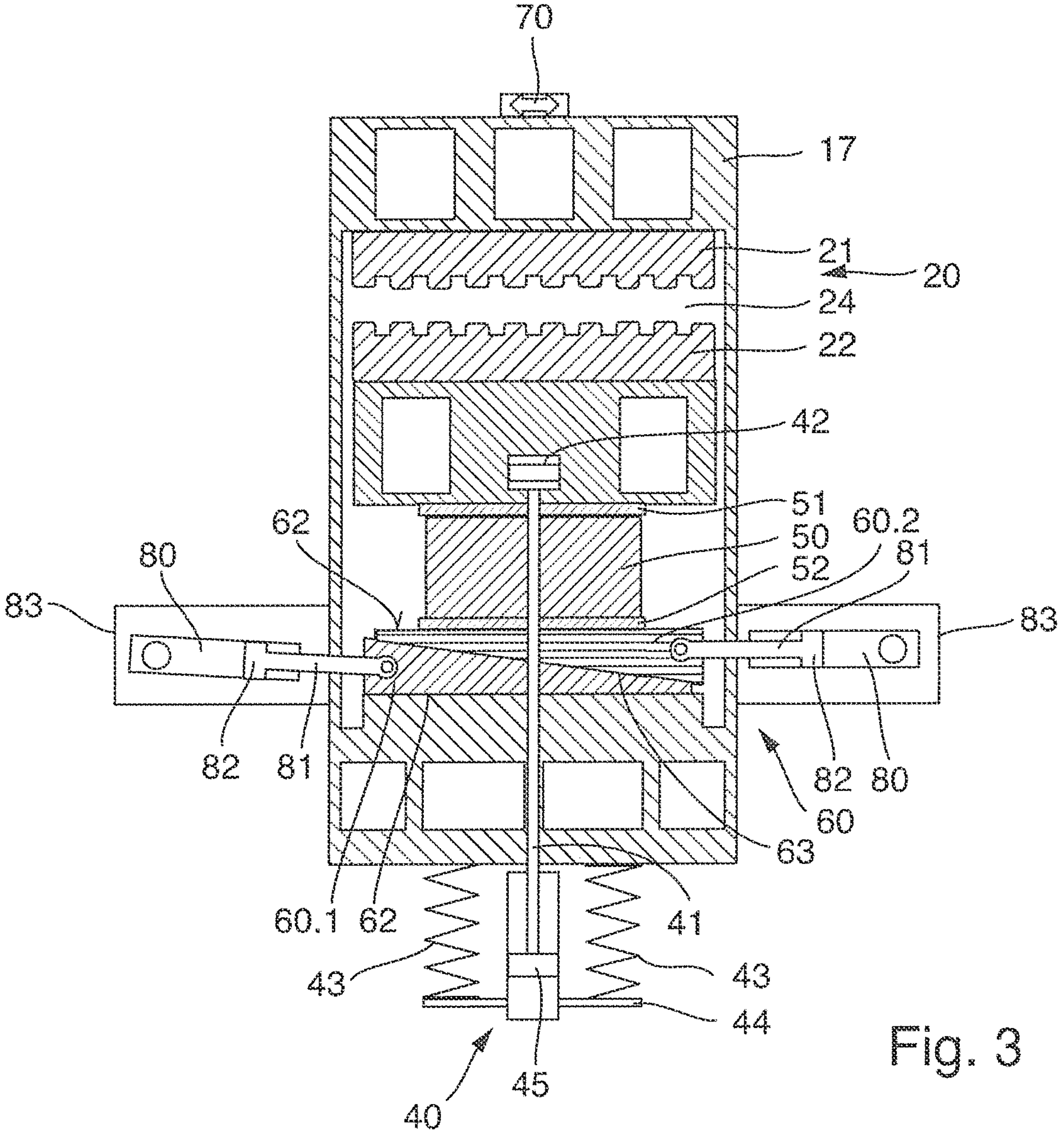
FIG. 3 shows the crushing unit as shown in FIG. 2 in a schematic illustration in a view from below onto the crushing gap and in a first operating position.

FIG. 3 shows that the pressing plate 50 is held between the two pressing plate bearings 51, 52. In the present exemplary embodiment, the adjusting unit 60 has inter alia two adjusting bodies 60.1, 60.2, which may be developed in the form of adjusting wedges, as in the present case. The adjusting wedges abut against each other by their wedge surfaces 63. The adjusting wedges are designed so that in the joined state, that is, when they abut against each other by their wedge surfaces 63, the opposite support surfaces 62 of the adjusting wedges 60.1, 60.2 are situated essentially in parallel to each other.

Figure 4:
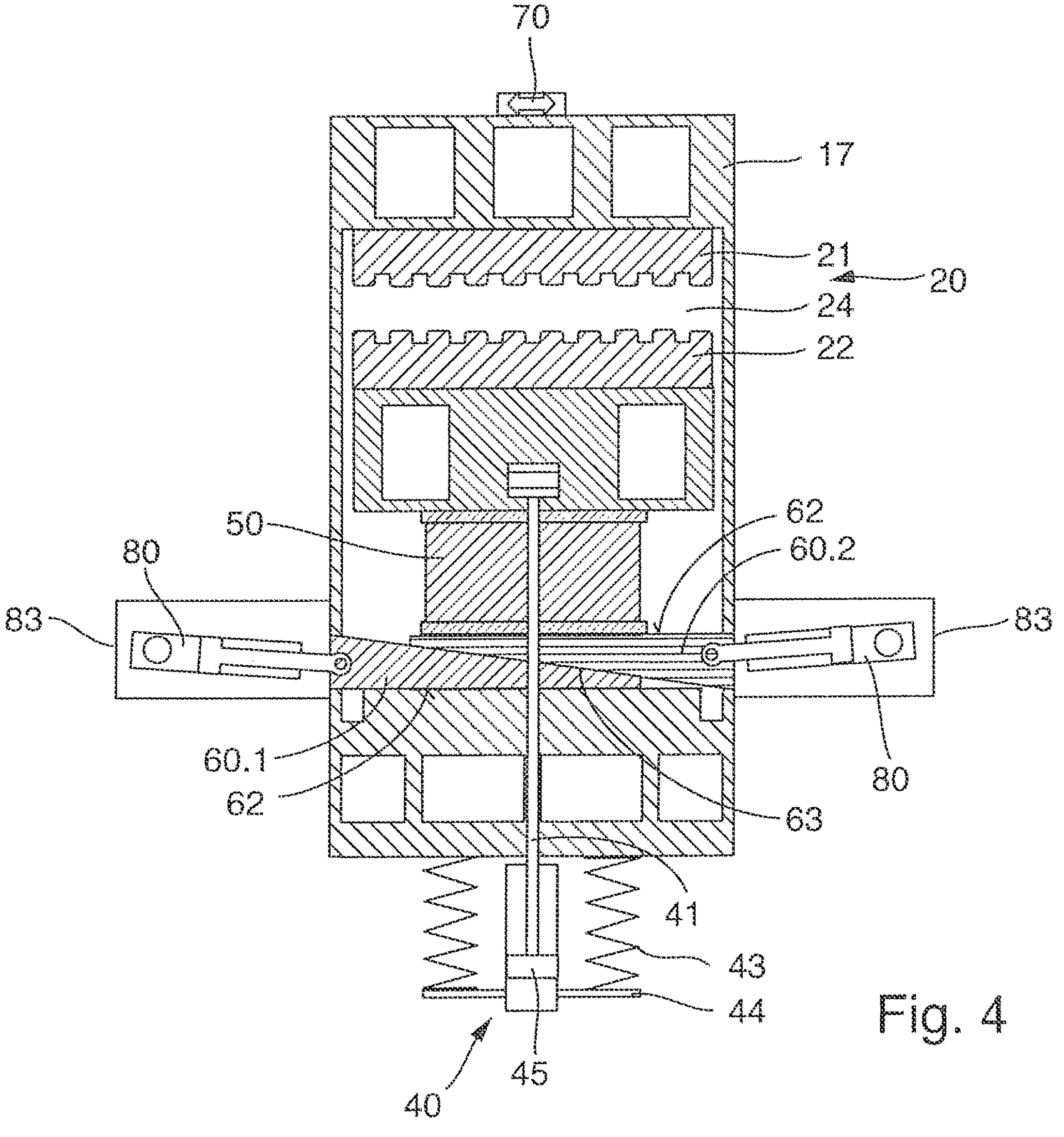
FIG. 4 shows the illustration as shown in FIG. 3 in an altered operating position.

As shown in FIGS. 3 and 4, an actuator 80 is assigned to each adjusting body 60.1, 60.2. The actuators 80 are preferably designed to be structurally identical. The actuators 80 may be designed as hydraulic cylinders. The actuators 80 have a coupling piece 81. Via this coupling piece 81, they are respectively connected to their associated adjusting body 60.1, 60.2. A piston 82 is coupled to coupling piece 81, which may be displaces in a cylinder housing of the actuator 80 in response to an adjustment of the hydraulic fluid. Mount fixtures 83 are used for fastening the actuators 80. Via these mount fixtures 83, the actuators 80 are connected to the crusher frame 17.

The actuators 80 are able to act bidirectionally. They are used to allow for the adjustment of the crusher outlet 24 during the normal crushing operation. Accordingly, they may be controlled via a control system for example. Since both actuators 80 are fixedly coupled to the adjusting bodies 60.1, 60.2, adjusting bodies 60.1, 60.2 may be displaced linearly by the actuators 80. Depending on the set position of the adjusting bodies 60.1, 60.2, the gap width of the crusher outlet 24 is then defined. The tensioning cylinder 40 follows the adjusting movement to ensure that the pressing plate 50 is always securely held between the two pressing plate bearings 51, 52.

While a small crusher outlet 24 is set in FIG. 3, an adjusted, larger crusher outlet 24 is set in FIG. 4.

As FIGS. 3 and 4 further show, the fixed crushing jaw 21 is supported on crusher frame 17. A load sensor 70 is fastened on crusher frame 17 in the area behind the fixed crushing jaw 21. The load sensor 70 measures the elastic elongation of the crusher frame 17 in the area in which the load sensor 70 is fastened. The load sensor 70 may of course also be fastened at another suitable location on crusher frame 17. It is also conceivable that the load sensor 70 is assigned to one of the two crushing jaws 21, 22 or to another machine component that is highly stressed in the crushing operation. The load sensor 70 may be described as being configured to detect an overload situation of the crushing unit 20 and to detect an operating change of the crushing unit 20 brought about as a consequence of the overload situation.

As the illustration of FIG. 2 shows, an additional deflecting piece 33 is situated on drive shaft 31 in a rotatably fixed manner. The deflecting piece 33 may be formed for example by a disk-shaped element, in the present case in particular by a cam disk. The disk-shaped element forms a control curve with its circumference.

FIG. 2 further shows that an activating unit 100 is assigned to the crushing unit 20.

Figure 5:
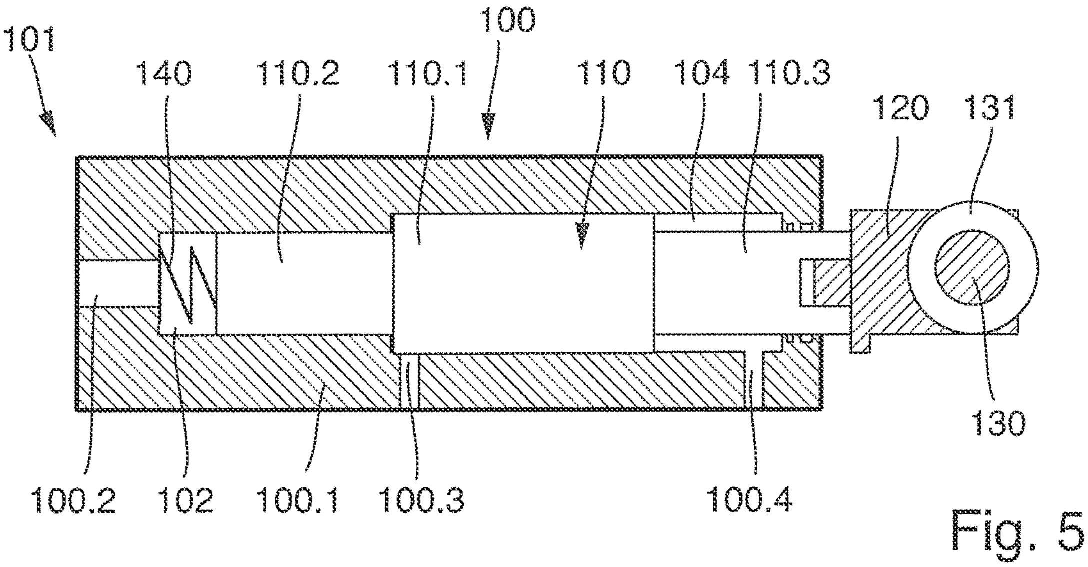
FIGS. 5 through 7 show an activating unit in various operating positions and FIG. 8 shows a transport device in a schematic illustration.
Figure 6:
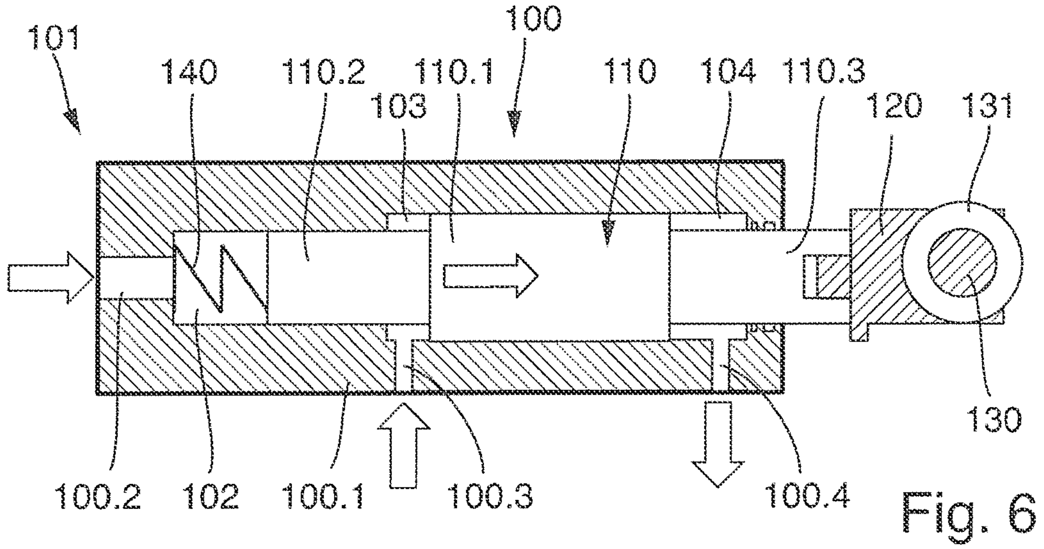
Figure 7:
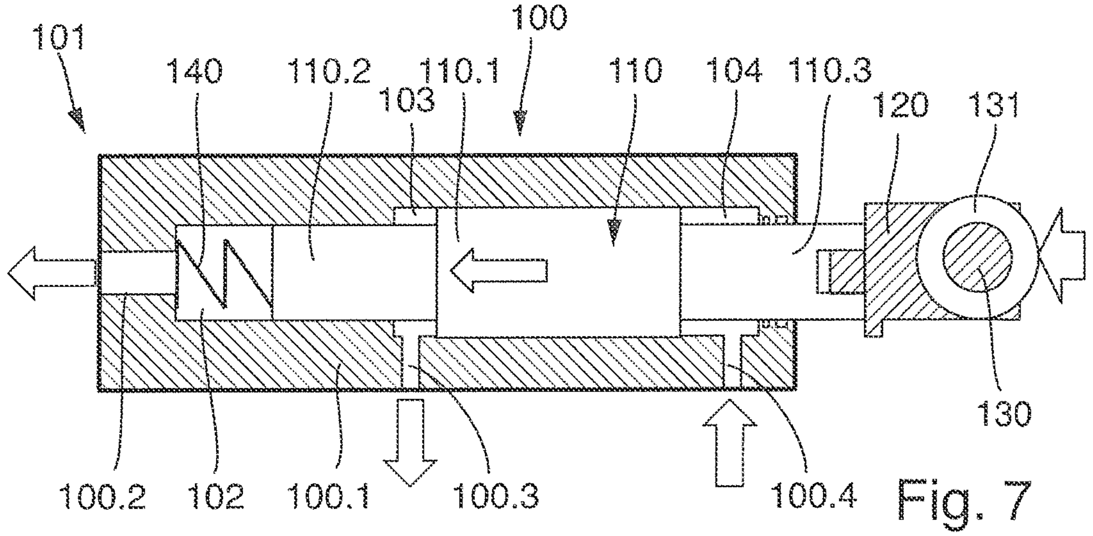

The structure of the activating unit 100 is now shown in detail in FIGS. 5 to 7. As these illustrations show, the activating unit 100 has a housing 101. The housing 101 may form at least one, in the present exemplary embodiment preferably three pump chambers 102, 103 and 104. Each pump chamber 102, 103 and 104 is equipped with a fluid connection 100.2, 100.3, 100.4. An activating element 110 is supported in the housing 100.1.

The activating element 110 may be displaced linearly in the housing 100.1. The activating element 110 has a first piston 110.1 and a second piston 110.2. Specific embodiments, in which only one piston 110.1 is used, are also conceivable. Compared to the second piston 110.2, the first piston 110.1 has relatively smaller diameter.

A connecting piece 110.3 is connected to the second piston 110.1. The activating element 110 is drawn out of the housing 100.1 by the connecting piece 110.3. The connecting piece 110.3 supports a head 120. A roller body 130 is rotatably connected to the head 120. The roller body 130 may have the shape of a wheel, as illustrated in the present case. The roller body 130 has an outer revolving rolling surface 131.

As the drawings show, the activating element 110 is supported in the housing 100.1 against the preload of a spring 140. The spring 140 acts on the activating element 110 preferably in the area of one of the pistons 110.1, 110.2 and may be accommodated in space-saving fashion in one of the pump chambers, preferably in the first pump chamber 102.

The activating unit 100 is spatially associated with the deflecting piece 33 (see FIG. 2). The roller body 130 is designed to roll off on the control curve of the deflecting piece 33 when the latter rotates jointly with the drive shaft 31.

FIG. 5 show the activating unit 100 in its basic position. The jaw crusher is operating normally. No overload situations exist. In this state, a control pressure is applied to pump chamber 104 via the fluid connection 100.4. This control pressure blocks the activating element 110 in the position shown in FIG. 5. The spring 114 exerts a spring preload on the activating element 110 against the pressure in the pump chamber 104.

If an overload case occurs now, then this results in the operating position shown in FIG. 6. Activating element 110 is extended accordingly. For this purpose, the control pressure is taken from the pump chamber 104. Via a fluid-conducting connection, the fluid is redirected from the pump chamber 104 into the second pump chamber 103. The spring 140 is able to relax, as a result of which the activating element 110 is extended. In the image plane shown in FIG. 6, the activating element 110 is therefore offset to the right. Additionally or alternatively, a pressure may be applied onto activating element 110 via fluid connection 100.2 in order to move it into its extended position. This pressure may preferably be applied on fluid connection 100.2 so that it also acts in the first pump chamber 102. Accordingly, this pressure effects or supports the extension of the activating element 110. When the activating element 110 has been extended, then the roller body 130 abuts on the control curve. When the drive shaft 31 and with it the control curve rotates, then the roller body 130 rolls off on the control curve. The roller body 130 accordingly follows the contour of the control curve. As soon as the roller body 130 rolls onto the deflecting piece 33, the situation illustrated in FIG. 7 results. A force F then acts on roller body 130. This is the force that is induced by the kinetic energy of the moving parts of the jaw crusher and crushing jaw drive. The force may reach a considerable magnitude solely by the fact that the great moving masses (movable crushing jaw 22, flywheel 30.1) provide a high kinetic energy in the system. Accordingly, a particularly high force may be provided at the activating element 110. The deflecting piece 33 thus pushes the activating element 110 into the housing 100.1 starting from the position shown in FIG. 6. In the process, the first piston 110.1 displaces the hydraulic fluid in the second pump chamber 103. At the same time, the piston 110.2 displaces the hydraulic fluid in the first pump chamber 102. The hydraulic fluid in the pump chamber 103 is fed to the tensioning cylinder 40. The hydraulic fluid in the pump chamber 102 is fed to the actuator 80. As a result, both the tensioning cylinder 40 as well as the actuator 80, which are both developed as hydraulic cylinders, are adjusted.

As was mentioned above, it is advantageous if not only one actuator 80, but both actuators 80 are adjusted at the same time. This makes it possible to enlarge the crusher outlet 24 within the shortest time. In this case, both actuators 80 are connected to the first pump chamber 102.

As a result of an adjustment of the two actuators 80, the two adjusting bodies 60.1 and 60.1 are shifted against each other. This allows the movable crushing jaw 22 to give way so that the crusher outlet 24 is enlarged. To prevent the pressing plate 50 from falling down, the tensioning cylinder 40 is activated, as mentioned previously. The tensioning cylinder 40 pulls the movable crushing jaw 22 against the pressing plate, so that the latter is always held in a state of tension.

Particularly preferably, it may be provided that for the purpose of opening the crusher outlet 24, the activating unit 100 acts upon the actuator(s) 80 twice or multiple times within one overload cycle. In that case, the activating unit may be constructed having a relatively small construction volume. It may be provided for example that the activating element 110 of the activating unit 100 described above performs two or multiple pump strokes. By one pump stroke, the actuator 80 and/or the tensioning cylinder 40 is then not moved over its entire adjustment travel, but only over a partial adjustment travel. After the deflecting piece 33 has been attached to the drive shaft 31, the pump strokes may be performed in quick succession, so as to enable a quick opening of the crusher outlet 24.

A development of the invention is also conceivable, in which the deflecting piece 33 is designed so that two or more pump strokes may be performed per revolution. A development of the invention is likewise conceivable, in which two or more activating units are used, all of which act simultaneously or in time-staggered fashion on the actuators.

The point in time, at which the pump action of the activating unit 100 is initiated, is determined by the position of the deflecting piece 33 on the drive shaft 31. The deflecting piece 33, which operates the roller body 130, is situated angularly offset with respect to the cam, which is responsible for the eccentric movement of the movable crushing jaw 22. Via this angular offset, the opening movement of the adjusting unit 60 may be synchronized for moving the movable crushing jaw. Particularly preferably, the setting of the deflecting piece 33 is such that the opening movement of the crusher outlet 24 is performed by the adjusting unit 60 shortly before the closing movement of the crusher outlet 24, which is performed by the rotation of the drive unit of the crusher. This ensures that uncrushable material in the crushing mouth is not squashed further and that the load on the mechanical system of the crusher is reduced. Any other setting of the deflecting piece 33 relative to the cam is also conceivable, however. It would in principle also be conceivable that the position of the deflecting piece 33 relative to the cam is adjustable in operation.

Thus, if starting from the position shown in FIG. 7, a pump stroke is now performed, then the activating element 110 moves into the position shown in FIG. 5. As soon as the deflecting piece 33 releases the roller body 130 again, the spring 140 and/or a control pressure applied on fluid connection 100.2 pushes the activating element 110 again into the position shown in FIG. 6. The activating element 110 is then again available for a subsequent further pump stroke.

During the proper crusher operation, the material to be crushed is conveyed by the material feeder device 11.1 to the crushing unit 20 and is crushed therein. The crushed material falls through the crusher outlet 24 onto the belt conveyor 14 and is taken away by the latter. At the transfer end of the belt conveyor 14, the crushed material is piled on the crushed material pile.

Now, it may happen that, along with the material to be crushed, non-crushable material is fed to the crushing unit 20 and enters the crushing chamber 23. This overload situation is detected in the detection device 19. For this purpose, for example, the signal of the load sensor 70 is detected in the detection device 19 and/or the controller 18.

As was mentioned above, in an overload situation, the opening width of the crusher outlet 24 is enlarged. In addition, the material feeder device 11.1 may also be stopped or the conveying speed of the material feeder device 11.1 may be reduced.

The faulty material situated in the crushing chamber 23 can now be discharged onto the belt conveyor 14 via the enlarged crusher outlet 24. The belt conveyor 14 is then used accordingly as a material store for this uncrushed faulty material 200.

For this purpose, the belt conveyor 14 continues to be operated, preferably at the same or at a reduced speed, so that the faulty material 200 is distributed on the belt conveyor 14 and is transported in the direction toward the transfer end of the belt conveyor 14.

The control device 18 generates an overload signal. As a function of this overload signal, the control device 18 subsequently controls the belt conveyor 14 and/or the removal device 90.

For this purpose, it may be provided that the position of the faulty material 200 on the belt conveyor 14 is recognized or detected indirectly or directly by the detection device 19 as a function of the overload signal.

It may be provided, for example, that the positions of the faulty material 200 on the belt conveyor 14 is monitored/detected indirectly via the transport speed of the belt conveyor 14. For this purpose, the drive speed of the belt drive 14.7 may be monitored, for example. This drive speed may then be signaled to the control device 18 via the control line 14.8, for example.

Additionally or alternatively, it is also possible for the faulty material ascertaining device 19.1 to detect the position of the faulty material 200 on the belt conveyor 14, before the latter reaches the transfer end of the belt conveyor 14.

In a first variant of an embodiment of the invention, as soon as the detection device 19 has detected/recognized indirectly or directly a specified transport position of the faulty material 200 on the belt conveyor 14, the belt conveyor 14 may be stopped, before the faulty material 200 reaches the transfer end of the belt conveyor 14. This prevents the faulty material 200 from being unloaded on the pile together with the properly crushed material. The crushing plant 10 may then be repositioned, for example. The crushing plant 10 may be moved into a position, for example, in which the faulty material 200 may be separately discharged beside the crushed material pile. It is also conceivable that the faulty material 200 is discharged into the loading bucket of a wheel loader. It is furthermore conceivable that in an appropriately constructed crushing plant 20, the position of the belt conveyor 14 is changed in order to displace the transfer end.

According to one variant of the invention, it may be provided that, after the reception of the overload signal and a time-limited operation of the belt conveyor at a reduced transport speed for storing the faulty material on the belt conveyor, the control device 18 is switched to a manual operating state. Within the scope of this manual operating state, it may be provided that first the belt conveyor 14 is stopped, regardless of whether the positioning of the belt conveyor is changed or for example a wheel loader bucket is positioned at the discharge end.

In the manual operating state, a signal link 18.1 may be established between a manual operating unit 18.2 and the control device 18. The manual operating unit 18.2 has operating elements 18.3. Using these operating elements, the operator is able to control functions of the crushing plant, in particular also the belt conveyor 14.

The operating elements and the control device 18 are preferably developed to control the belt drive 14.7 of the belt conveyor 14, preferably with a variable speed selected by the operator. This preferably occurs via a wireless signal link or via a wire-bound signal link on the machine.

The machine operator is thereby able, for example, to let the belt conveyor 14 run at a low speed until the faulty material has been separated (separate pile or wheel loader bucket, etc.). The machine operator is also able to stop and start the belt conveyor 14 manually as desired, for example in order to be able to remove individual faulty material items manually from the belt conveyor 14.

Only when the entire faulty material has been separated from the belt conveyor 14 with the aid of the manual operating unit will the machine operator switch the plant back into normal operation. This may be done for example within the scope of a restart mode specified, preferably hard-coded, in the control device. For example, first the belt conveyor 14 and in a specified sequence the remaining plant components (e.g.: crushing unit 20, material feeder device 11.1) may be started slowly.

Via the manual operating mode, it is possible to react in a particularly flexible manner adequately to any type of faulty material.

In a further variant of the invention, it may be additionally or alternatively provided that the removal device 90 is used. As soon as the detection device 19 has detected the positions of the faulty material 200 at a certain location on the belt conveyor 14, the removal device 90 is adjusted by the adjusting device 96 from its normal position into the removal position shown in FIG. 1 and the conveyor belt 95 of the removal device 90 is activated. The belt conveyor 14 continues to be operated so that the faulty material 200 is continuously or discontinuously fed to the removal device 90. The faulty material 200 is then discharged laterally from the belt conveyor 14 by the removal device 90, either onto a separate faulty material pile 201 or for example into the bucket of a wheel loader.

After the overload situation has ended, that is, when the uncrushable material has left the crushing chamber 23, the actuators 80 again set the size of the crusher outlet 24 appropriate for the crushing task at hand, as was described above.

Subsequently, the material feeder device 11.1 is again set to the specified conveying speed. The crushing plant 10 may then continue to be operated 9 in the proper manner.

The invention claimed is:

1. A crusher plant, comprising:

a jaw crusher including a crushing chamber having a crusher outlet to allow crushed material to exit the crushing chamber;

at least one actuator configured to adjust an opening size of the crusher outlet to allow faulty material to be discharged from the crushing chamber;

a belt conveyor configured to convey the crushed material or the faulty material in a material conveying direction from the crusher outlet toward a transfer end of the belt conveyor;

a load sensor configured to detect an overload of the jaw crusher and to generate an overload signal when an overload is detected;

a controller configured to receive the overload signal and at least in part in response to the overload signal to control the belt conveyor and/or to monitor a position of the faulty material on the belt conveyor; and a faulty material position sensor configured to monitor the position of the faulty material on the belt conveyor.

2. The crusher plant of claim 1, wherein:

the faulty material position sensor is an optical sensor or an acoustic sensor.

3. The crusher plant of claim 1, wherein the faulty material position sensor includes a counter configured to indirectly monitor the position of the faulty material on the belt conveyor.

4. The crusher plant of claim 1, wherein:

the belt drive includes a frequency converter for electrically controlling the belt drive.

5. The crusher plant of claim 1, wherein:

the belt drive includes a mechanical or hydraulic gear.

6. The crusher plant of claim 1, wherein:

the belt conveyor is configured to swivel relative to a machine frame so that a position of the belt conveyor is changeable after the belt conveyor is stopped.

7. The crusher plant of claim 1, further comprising:

a material feeder configured to feed material to be crushed to the jaw crusher; and wherein the controller is configured to control the material feeder to reduce or stop a quantity of material fed to the crushing unit in response to the overload signal.

8. A crusher plant, comprising:

a jaw crusher including a crushing chamber having a crusher outlet by which crushed material may exit the crushing chamber;

at least one actuator configured to adjust an opening size of the crusher outlet to allow faulty material to be discharged from the crushing chamber;

a belt conveyor configured to convey the crushed material or the faulty material in a material conveying direction from the crusher outlet toward a transfer end of the belt conveyor;

a load sensor configured to detect an overload of the jaw crusher and to generate an overload signal when an overload is detected; and a controller configured to receive the overload signal and at least in part in response to the overload signal to control the belt conveyor and/or to monitor a position of the faulty material on the belt conveyor;

wherein the controller is configured such that following reception of the overload signal the crusher plant is switched to a manual operating state in which an operator of the crusher plant may control the belt conveyor with a manual operating unit; and wherein the controller and the manual operating unit are configured to provide a restart mode wherein following activation of the restart mode, first the belt conveyor is started up, and subsequently the jaw crusher and then a material feeder which feeds material to be crushed to the jaw crusher are reset.

9. The crusher plant of claim 8, wherein:

the controller and the manual operating unit are configured to vary a conveying speed of the belt conveyor and/or stop the belt conveyor.

10. The crusher plant of claim 8, wherein:

the manual operating unit is connected to the controller by a bidirectional signal link.

11. A crusher plant, comprising:

a jaw crusher including a crushing chamber having a crusher outlet to allow crushed material to exit the crushing chamber;

at least one actuator configured to adjust an opening size of the crusher outlet to allow faulty material to be discharged from the crushing chamber;

a belt conveyor configured to convey the crushed material or the faulty material in a material conveying direction from the crusher outlet toward a transfer end of the belt conveyor;

a load sensor configured to detect an overload of the jaw crusher and to generate an overload signal when an overload is detected;

a controller configured to receive the overload signal and at least in part in response to the overload signal to control the belt conveyor and/or to monitor a position of the faulty material on the belt conveyor; and a removal conveyor located between the crusher outlet and the transfer end of the belt conveyor and configured to remove the faulty material from the belt conveyor.

12. The crusher plant of claim 11, wherein:

the controller is configured to switch the removal conveyor into an operating state in which the removal conveyor removes the faulty material from the belt conveyor.

13. The crusher plant of claim 11, wherein:

the removal conveyor is configured to remove the faulty material in a transverse direction relative to the material conveying direction of the belt conveyor.

14. The crusher plant of claim 11, wherein:

the removal conveyor includes a revolving removal conveyor belt, the removal conveyor belt including a plurality of deflectors configured to remove the faulty material from the belt conveyor.

15. The crusher plant of claim 11, wherein:

the removal conveyor is adjustable between a return position in which the removal conveyor is lifted off of the belt conveyor, and a removal position in which the removal conveyor is configured to remove the faulty material from the belt conveyor.

* * * * *